May 22, 1934.  K. C. MONROE  1,959,684
ELECTRIC METAL HEATER AND CONTROL THEREFOR
Filed March 11, 1931
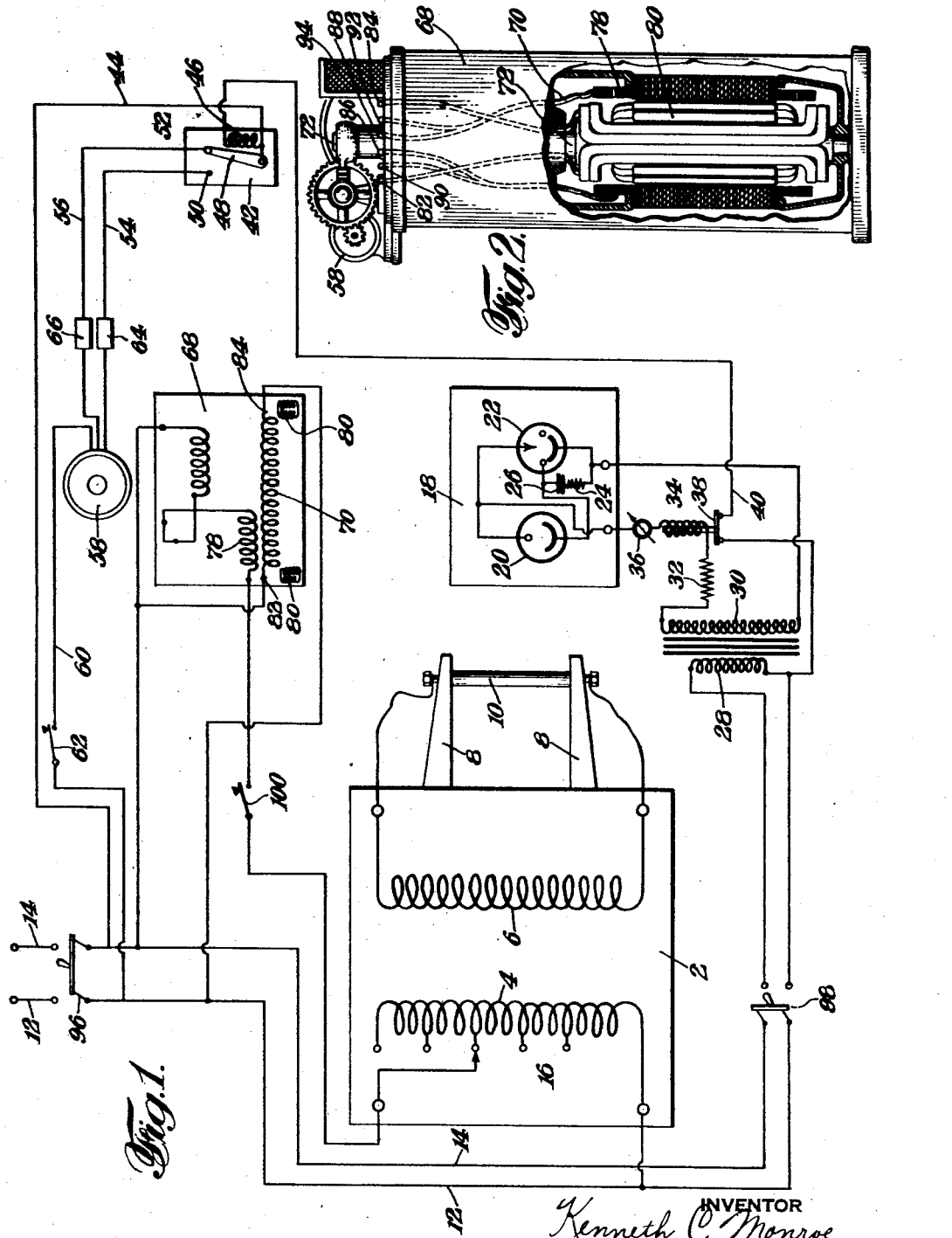
INVENTOR
Kenneth C. Monroe
BY
Prindle Bean & Mann
ATTORNEY Patented May 22, 1934

1,959,684

UNITED STATES PATENT OFFICE 1,959,684

ELECTRIC METAL HEATER AND CONTROL THEREFOR

Kenneth C. Monroe, Bridgeport, Conn., assignor to Bridgeport Brass Company, Bridgeport, Conn., a corporation of Connecticut Application March 11, 1931, Serial No. 521,743

5 Claims. (Cl. 219—11)

This invention relates to an electric ingot heater with a circuit and connected mechanism for holding the heat of the ingot within certain limits.

The usual ingot heater is merely a device in which a work blank or ingot is subjected to heat and no means are provided for controlling the temperature to which the work blank or ingot is heated. Electric ingot heaters are usually used in a factory which is supplied with electricity from a power house and the voltage on the power lines is subject to great variation with the result that the ingot is quite frequently given too much or too little heat. Furthermore, it quite frequently happens that the workman is not ready to take the ingot out of the heater when it reaches the correct temperature and therefore leaves it in the heater, with the result that the ingot is given too much heat.

It is, therefore, highly desirable that means be provided to regulate the heat applied to the ingot so that if the voltage on the power lines rises unexpectedly, or if the workman leaves the ingot in the heater, the ingot will not be given too much heat and, on the other hand, if the voltage on the power lines decreases unexpectedly, the ingot will be brought up to the correct heat without causing the workmen to lose time in waiting for the ingot to become hot enough for use.

In order to overcome the defects in prior devices, a light responsive device is placed in a position where it can receive light from a glowing ingot and controls a regulator which regulates the amount of heat applied to the ingot. For electric ingot heaters the heat controlling means may be an induction voltage regulator connected in the circuit which supplies the electricity for heating the ingot. With this arrangement it is possible to hold the temperature of the ingot within rather narrow limits. If the voltage on the power line falls, the ingot will cool off and, therefore, the light or heat which is radiated from the ingot will decrease. When this happens the light responsive device automatically operates the induction voltage regulator or other means for boosting the voltage applied to the ingot, and the ingot is brought up to the correct temperature. On the other hand, if the voltage on the power line unexpectedly rises and the power applied to the ingot is thereby increased, the light radiated from the ingot will also be increased. Under these conditions, the light responsive device operates the induction voltage regulator to decrease the voltage applied to the ingot so that the temperature of the ingot falls.

Also if the workman does not take the ingot out of the heater when it reaches the correct temperature, but permits it to remain in the heater so that its temperature rises above the desired point, the light responsive device operates the induction voltage regulator to decrease the power applied to the ingot. The induction voltage regulator is automatically operated by a motor or other suitable mechanism connected to the light responsive device, and limit switches or other suitable devices are preferably in the motor circuit to limit the operation of the induction voltage regulator so that the voltage applied to the heater will not vary so much as to cause the regulator to be in continual operation.

Other objects and features of the invention will more fully appear from the following claims taken in conjunction with the description and the accompanying drawing which, however, must be considered as merely illustrating and in no way limiting the invention to the specific embodiment shown and described.

The drawing illustrates rather diagrammatically an operative form of the invention.

In the drawing:

Fig. 1 is a diagrammatic showing of an electric ingot heater with the light responsive device and a voltage regulator and the circuits which are used.

Fig. 2 is a side view of an induction voltage regulator with part of the casing broken away to show the windings.

The ingot heater comprises a casing 2, containing a primary winding 4 and a secondary winding 6. The secondary winding is connected to a pair of electrodes 8 between which the ingot 10 is placed so that the ingot is heated by the passage of the electric current through it. Current is supplied to the primary of the heater from power lines 12 and 14, and the primary is preferably provided with taps 16 so that the voltage generated by the secondary 6 and applied to the ingot can be set for the average voltage which is desirable depending upon the time within which the ingot must be heated and the size, conductivity, etc., of the ingot.

The light responsive device, which is designated generally at 18, includes a photoelectric cell 20 which is so positioned as to receive light from the glowing ingot. A grid glow tube 22 is connected in the circuit of the photo cell as shown, with the proper rated grid resistor 24 and grid condenser 26 to form an operative unit. The power for operating the light responsive device is obtained from a transformer having a primary winding 28 connected to the power lines 12 and 14, and a properly rated secondary 30 which supplies the necessary current to both the photoelectric cell and the grid glow tube through the resistance 32, relay coil 34 and, if desired, the ammeter 36. The effect of the light responsive device is that when the light radiated from the ingot 10 reaches a certain predetermined maximum value, the coil 34 is sufficiently energized to break the circuit at the switch 38 and when the ingot is so cold that it does not radiate sufficient light to operate the light responsive device, the switch 38 is closed.

Wire 40 carries the current from the power line wire 12 through the switch 38 to a double contact switch 42 from which wire 44 takes the current to the other power line wire 14. Within the switch 42 is a magnetic device represented by the coil 46 which moves the spring actuated blade 48 of the switch from one contact 50 to the other contact 52 so that the electric current passes through either one of the wires 54 and 56 to drive the regulator motor 58 either forward or backward to change the setting of the regulator. Wire 60 connects the motor 58 to the power line wire 12 and a switch 62 enables the motor 58 to be stopped if so desired. Limit switches 64 and 66 enable the workman to limit the operation of the motor 58 and induction voltage regulator 68, so that the additive or subtractive voltage applied to the primary 4 of the heater by the induction voltage regulator, may be limited. The connections and operations of the light responsive device including its relay switch 38, and the induction voltage regulator 68 with its associated motor 58, relay switch 38 and limit switches 64 and 66 are such that when the ingot 10 is too hot, that is, when it radiates too much light or heat, the photo cell 20 breaks the circuit through the wire 40 at the switch 38 to de-energize the magnet 46 in the switch 42 which permits the spring actuated switch blade 48 to contact with the pole 50 thereby starting the motor 58 to operate the induction voltage regulator 68 to decrease the voltage on the primary 4 of the heater and thus decrease the power applied to the ingot 10. After the motor 58 has operated to decrease the voltage by the amount for which switch 64 is set, the limit switch stops the motor 58. This usually occurs before the ingot 10 has cooled down sufficiently to cause the light responsive device to reverse the motor. If the voltage on the power lines 12 and 14 drops to such an extent that the ingot 10 does not hold its temperature or when a cold ingot is put into the heater, the photo cell 20 permits the switch 38 to close thus energizing the coil 46 on the relay switch 42 to pull the switch blade 48 over to the contact 52, whereupon the motor 58 is operated to change the setting of the induction voltage regulator 68 so that the voltage on the primary 4 of the heater is boosted above the power line voltage. If the ingot 10 is cold the added voltage of the induction voltage regulator brings the ingot up to heat more quickly than the line voltage would if not assisted by the regulator, and if the ingot 10 has previously been up to heat and has cooled down due to a drop in the line voltage, the photo cell 20 also permits the switch 38 to close to operate the switch 42 to rotate the motor 58 in the proper direction for the induction voltage regulator to boost the voltage applied to the primary 4 of the heater. Limit switch 66 limits the movement of the motor 58 as previously described with regard to limit switch 64. With this system, therefore, a cold ingot is brought up to heat more quickly than would otherwise be the case and is then held at the proper temperature within the limits for which the light responsive device and the limit switches 64 and 66 in the induction voltage regulator, are set.

The constructional features of the induction voltage regulator are shown in Fig. 2. The regulator has two power windings which are so placed that one winding induces a voltage in the other and the two windings are movable with respect to each other so that the magnetic flux can be varied and the voltage changed in a smooth curve. The voltage regulator operates on a magnetic principle and uses a negligible amount of power. The primary winding 70 of the voltage regulator is connected across the power lines 12 and 14 and is mounted within the casing 68 on a rotor shaft 72 which is driven by the motor 58 through gears 74 and sector 76 to rotate the primary windings with respect to the secondary windings 78 which are stationary within the casing. Short circuited windings 80 on the rotor shaft 72 are used to overcome the choking effect of the magnetic flux which is set up by the line current flowing through the secondary windings which if not neutralized would lower the power factor in the feeder circuit. The secondary winding is usually in two parts which can be connected in series or in parallel, but are here shown as connected in series. The outlets 82 and 84 of the primary are connected across the power lines 12 and 14 and the outlets 86 and 88 of the secondaries are connected together while the outlets 90 and 92 are connected in series with one side of the power line which may be the power wire 14. The limit switches 64 and 66 are within the casing 94 as may also be the relay switch 42 if desired.

Switches 96 and 98 and 100 may, if desired, be placed in the main power line or in that part of the power line which supplies the current to the light responsive device or in the line to the primary 4 of the electric heater and any or all of these switches may be operated by a safety device (not shown) or the treadle (not shown) of the heater which opens the electrodes 8 so that the entire system can be disconnected from the power lines or the heater or the light responsive device may be disconnected from the power lines, as desired.

The specific form of the invention which has been described includes an ingot heater which heats the ingots by the resistance of the ingot to the passage of the current and also includes a motor driven voltage regulator. It is to be understood that various other forms of ingot heaters and regulators may be used and also various other forms of light responsive devices and systems of connection. It is, therefore, to be understood that although a particular and preferred form of the invention has been described, it is recognized that various modifications may be made and it is desired that the invention be construed as broadly as the claims taken in conjunction with the prior art may allow.

What I claim is:

1. In combination, electrical means for heating ingots and the like; a motor operated regulator connected to increase and decrease the current progressively to said heating means; alternative circuits for the motor of said regulator to operate the latter to increase or decrease said current progressively; a switch connected to render one or the other of said circuits operative, said switch being biased so that normally it renders operative the circuit which increases the heating current; a device responsive to the temperature of the ingot as heated by the electrical means; means for operating the switch to render the other motor circuit operative for decreasing the heating current, said means being controlled by the responsive device so as to operate when the ingot has reached a predetermined heat.

2. The device defined in claim 1 further characterized by means in connection with each alternative circuit for automatically rendering it inoperative after it has been in operation for a predetermined time interval.

3. The means defined in claim 1 further characterized by means in connection with at least one of said alternative circuits for automatically rendering it inoperative after it has been in operation for a predetermined time interval.

4. In combination, an electrical transformer suitable for heating ingots and the like, a motor operated voltage regulator connected to increase and decrease progressively the input to said transformer; alternative circuits for the motor of said regulator to operate the regulator to increase or decrease said input progressively; a switch connected to render one or the other of said circuits operative, said switch being biased so that normally it renders operative the circuit which increases the input to the transformer; a device responsive to the temperature of the ingot as heated by the transformer; means for operating the switch to render the other motor circuit operative for decreasing the input to the transformer, said means being controlled by the responsive device so as to operate when the ingot has reached a predetermined heat; and means in connection with at least one of said alternative motor circuits for automatically rendering it inoperative after it has been in operation for a predetermined time interval.

5. In combination, electrical means for heating ingots and the like; a motor operated regulator connected to increase and decrease the current progressively to said heating means; alternative circuits for the motor of said regulator to operate the latter to increase or decrease said current progressively; a switch connected to render one or the other of said circuits operative; a device responsive to the temperature of the ingot as heated by the electrical means; means for operating said switch, said means including and being controlled by said responsive device; and means in connection with at least one of said alternative circuits for automatically rendering it inoperative after it has been in operation for a predetermined time interval.

KENNETH C. MONROE.